United States Patent [19]
Bruhn, Jr.

[11] 3,774,469
[45] Nov. 27, 1973

[54] GEAR SHIFT MECHANISM
[75] Inventor: Max R. C. Bruhn, Jr., Spring Lake, Mich.
[73] Assignee: Grand Haven Stamped Products Company, Grand Haven, Mich.
[22] Filed: Apr. 24, 1972
[21] Appl. No.: 247,154

[52] U.S. Cl. .............................................. 74/476
[51] Int. Cl. ............................................. G05g 9/12
[58] Field of Search ..................... 74/475, 476, 477, 74/473 R, 473 P

[56]  References Cited
  UNITED STATES PATENTS
3,323,387 6/1967 Hurst, Jr. et al. ..................... 74/476
3,264,895 8/1966 Turunen ............................... 74/477
3,572,152 3/1971 Bruhn, Jr. et al. .................... 74/476
3,306,126 2/1967 Hobbins ............................... 74/473

Primary Examiner—Allan D. Herrmann
Attorney—Peter P. Price et al.

[57]  ABSTRACT

A gear shifting mechanism having a plurality of gear actuating members mounted in a housing for sliding movement in response to shifting movement of a selector. The selector has engaging means movably mounted in the housing by said selector for movement to different positions for engagement with different ones of said slidably mounted actuating members to effect movement thereof. The gear shifting mechanism also has a novel lift gate system for moving the engaging means of the lever out of its stop abutting position where it actuates the forward gears and into reverse gear position.

16 Claims, 9 Drawing Figures

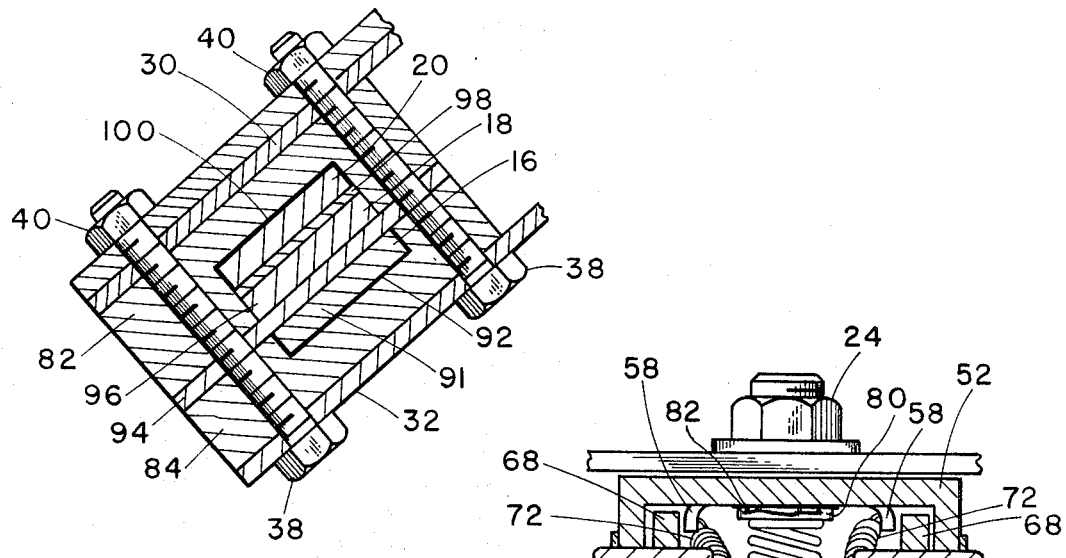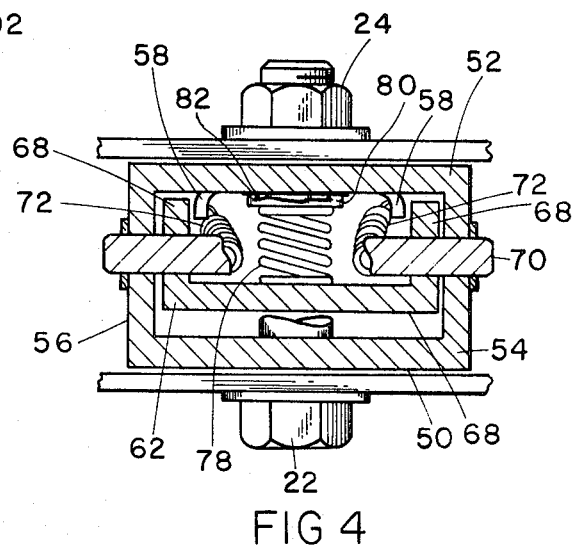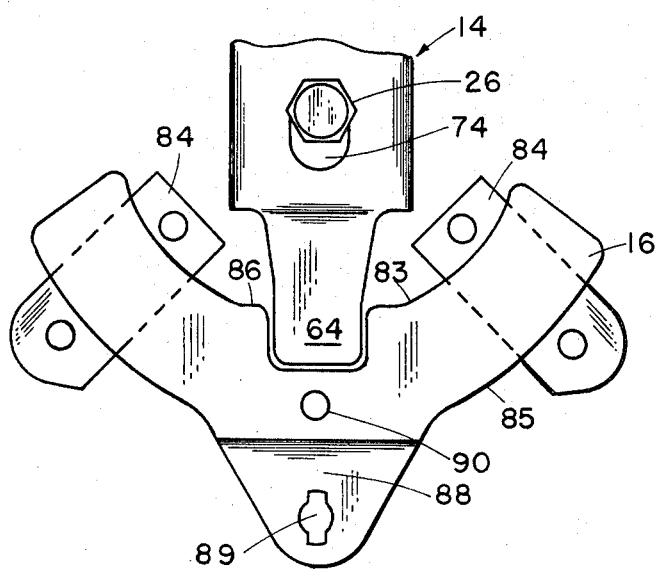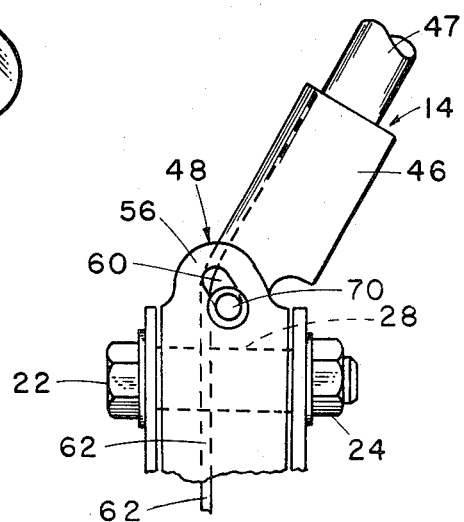

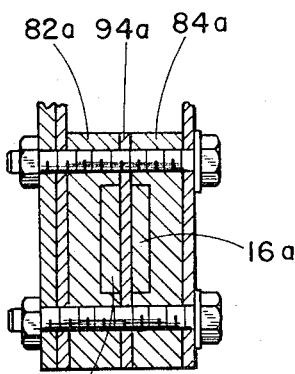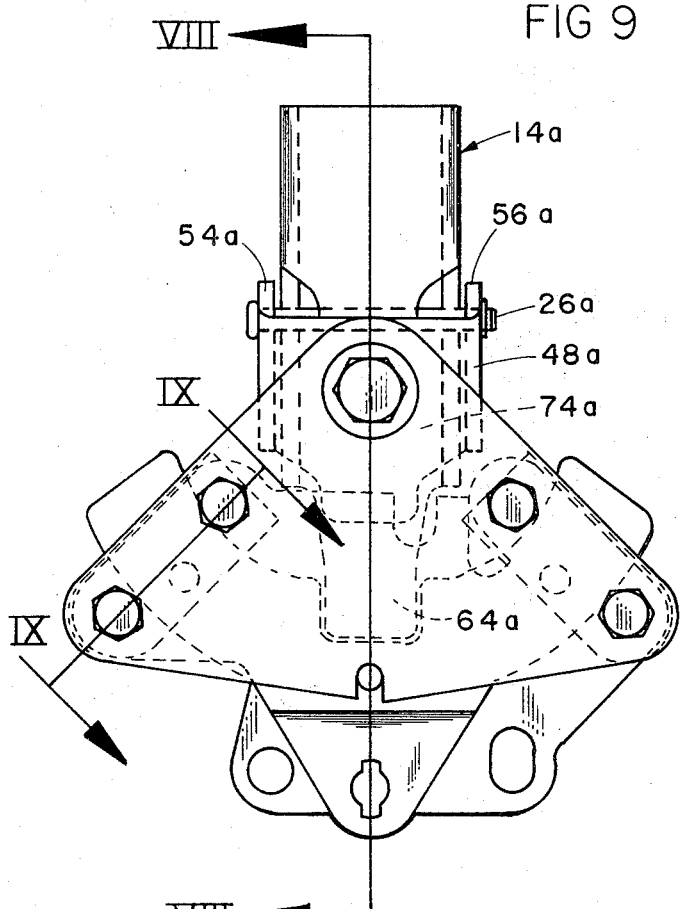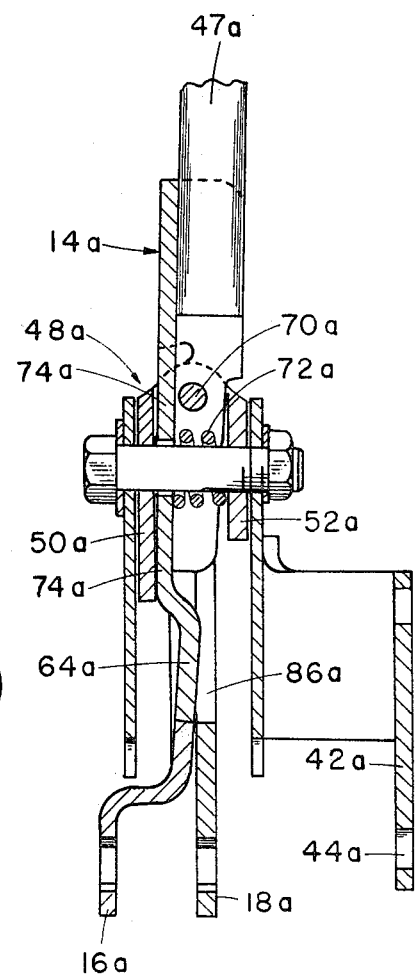

GEAR SHIFT MECHANISM

BACKGROUND OF THE INVENTION

This invention relates to gear shift mechanisms and, in particular, to a gear shifting mechanism in which a selector within a housing is adapted to engage forward and reverse gear actuating members by means of an extending arm member. The actuating members are curvilinear in shape and are mounted for sliding movement in guide means fixed within the housing. Recesses or slots provided in each of the actuating members are selectively engageable by the arm member on the selector and are movable thereby to effect a shifting function.

One type of manual gear shifting mechanism is disclosed in Hurst, Jr. et al., U.S. Pat. No. 3,323,387 issued June 6, 1967, entitled GEAR SHIFT MECHANISM in which the shift mechanism employs a pin member having a selector engaging head insertable through slots in a central portion of each of the gear actuating levers which are pivotally mounted on a common axis.

Another type of manual gear shifting mechanism is disclosed in the Bruhn, Jr. et al., U.S. Pat., No. 3,572,152 issued Mar. 23, 1971, entitled GEAR SHIFT MECHANISM which provides a selector within a housing for engaging forward and reverse actuating levers through a C-shaped gripping element which contacts each of the levers at the outer edges thereof.

In either case, the actuator members are levers pivotally mounted about a central shaft or axis and the selector mechanism is relatively complicated as it must be designed to operate with and through a plurality of mechanisms to selectively engage one of the actuator levers. Where the actuator levers are provided with pins and slots, breakage of the pin members often results. Mechanisms which embrace and engage the outer portions of the actuating levers are generally quite bulky in their construction and require excessive space for the mounting thereof. To prevent accidental or inadvertent engagement of the reverse gear actuator member special lockout mechanisms are generally provided. Each of the above-mentioned prior patents rely on a biasing means to normally bias the selector away from reverse gear actuating position. A force substantially greater than the normal gear shifting force is then required to overcome the bias to shift into reverse gear. In this type of gear shifting mechanism, reverse gear is sometimes difficult to engage. Other shifting units, known to those skilled in the art, sometimes employ a separate actuator on the shifting stick which is mechanically connected to lockout mechanisms which must be shifted out of position prior to engagement of reverse gear.

SUMMARY OF THE INVENTION

The present invention provides a gear shifting mechanism which does not suffer from the above-outlined disadvantages of the prior art. The gear shifting mechanism is compact in size and relatively simple in its construction. In one of its aspects, the invention provides a novel lockout mechanism for preventing accidental engagement of the reverse gear actuator as the mechanism is shifted.

Accordingly, it is a primary object of the present invention to provide a gear shift mechanism having novel supporting means for slidably supporting the actuator members.

It is another object of the invention to provide a gear shift mechanism wherein novel selector means are provided for selective engagement of each of the actuator members.

It is another object of the invention to provide a novel lift gate mechanism for preventing inadvertent engagement of the reverse gear actuator member but which by a slight pressure upwardly causes it to lift upwardly out of stop-abutment position.

It is still another object of this invention to provide a selector and gear-actuating members which are uniquely self-contained within a housing.

These and other important aspects, objects, and the many advantages of this invention will become apparent to one skilled in the art from a study of this disclosure, the drawings, and the appended claims.

According to one aspect of this invention, there is provided a manual gear shift mechanism including a housing, a plurality of gear actuating members slidably mounted within the housing and a selector having means thereon for selectively engaging one of the gear actuating members. The selector is mounted within the housing for pivotal movement about a first and second axis, one of the axes being substantially perpendicular to the other axis to thereby selectively engage one of the gear actuating members and for movement of the member so engaged into a gear actuating position.

In another aspect of this invention, a lift-gate mechanism is provided having a stop-abutment means for preventing accidental engagement of the reverse gear actuating member but upon exerting a slight pressure on the lever causes it to raise out of stop-abutment position permitting it to actuate the reverse gear.

BRIEF DESCRIPTION OF THE DRAWINGS

The invention will now be described with reference to the accompanying drawings in which:

FIG. 3 is a fragmentary cross-sectional view taken along the plane III—III of FIG. 1;

FIG. 4 is a cross-sectional view of the selector taken along the plane IV—IV of FIG. 1;

FIG. 5 is a cross-sectional view taken along the plane V—V of FIG. 2 illustrating in somewhat schematic form the interengagement between the selector and one of the actuator members;

FIG. 6 is a partial side elevational view of the gear shift mechanism as viewed along the plane VI—VI of FIG. 1;

FIG. 7 is a view similar to FIG. 1 illustrating a three-speed gear shifting mechanism;

FIG. 8 is a cross-sectional view similar to FIG. 2 and taken along the plane VII—VII of FIG. 6; and FIG. 9 is a cross-sectional view similar to FIG. 3 taken along the plane VIII—VIII of FIG. 6.

DESCRIPTION OF THE PREFERRED EMBODIMENT

Figure 1:
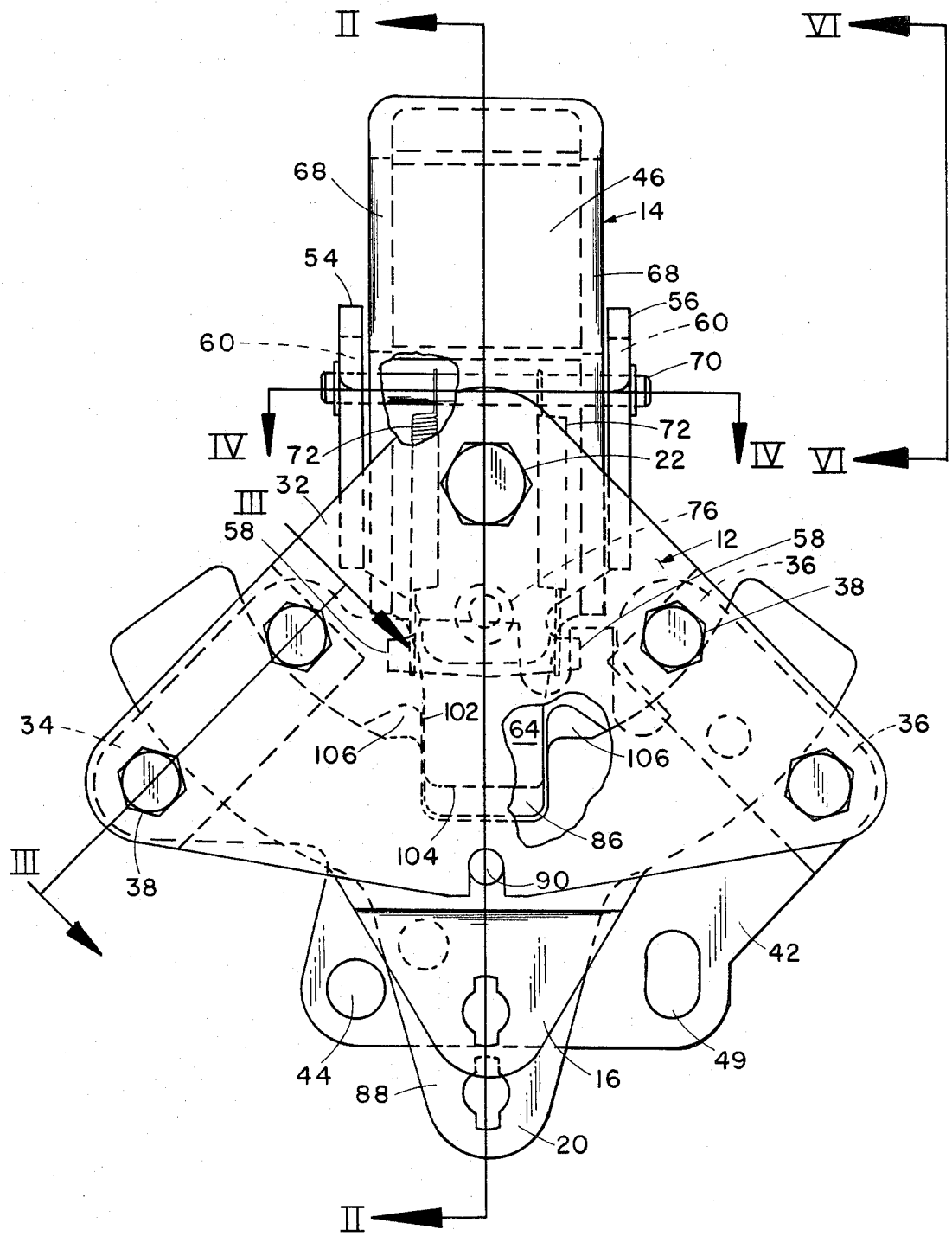
FIG. 1 is an elevational view of a novel four-speed gear shift mechanism according to the invention.
Figure 2:
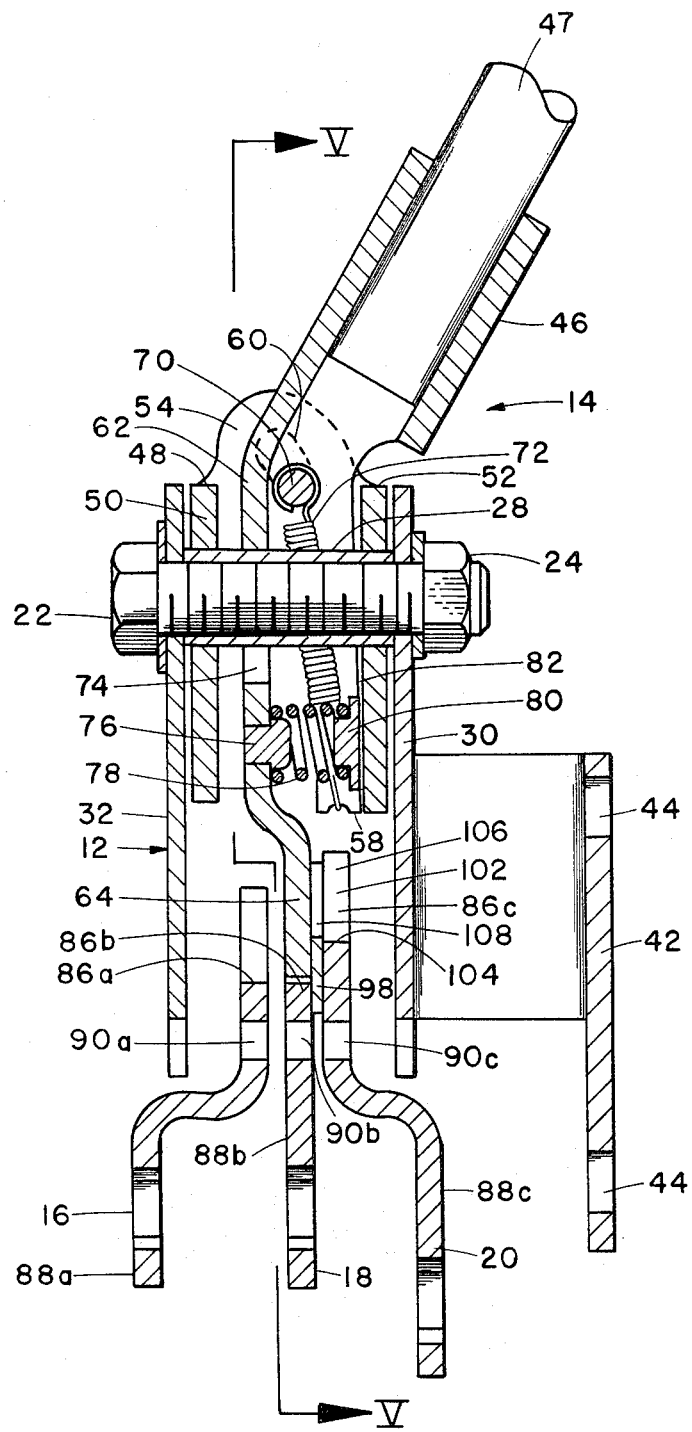
FIG. 2 is a cross-sectional view of the gear shift mechanism taken along the plane II—II of FIG. 1.

Referring now to the drawings, and in particular to FIGS. 1 and 2, the gear shift assembly includes a housing 12, a selector mechanism 14, and a plurality of gear actuating members 16, 18, and 20 including a first-second gear actuating member 16, a third and fourth gear actuating member 18 and a reverse gear actuating member 20 all slidably mounted in the housing 12 and each having an outwardly extending flange portion from the bottom of the housing for connection to gear actuating levers (not shown).

A bolt 22 extends between the sides of the housing at an upper portion and is retained therein by a nut 24. The bolt 22 forms a pivot shaft upon which the selector mechanism 14 is rotatably supported on a bushing 28 as will be more fully described hereinafter. The housing 12 includes a pair of triangular-shaped side walls 30 and 32. The side walls are held in a spaced-apart position by means of the bushing 28 in the upper portion thereof and by a pair of spacer and guide assemblies 34 and 36 (FIG. 3) positioned in the lower corners of the triangular-shaped side walls. A plurality of bolts 38 passing through the side walls and guide members 34 and 36 are fastened by nuts 40 to hold the side walls 30 and 32 together.

A mounting flange 42 is fixed to side wall 30 by means of the nuts and bolts 38 and 40 and extends a slight distance outwardly from the side of the housing. Openings 44 are provided in a side of the flange 42 for mounting the shifting mechanism within an automobile by bolts or the like to the transmission housing case (not shown).

The selector assembly 14 is mounted for movement about bushing 28 and includes a socket portion 46 adapted to receive a shifting stick 47. Preferably, a gear shift coupling mechanism of the type disclosed in commonly assigned application Ser. No. 24,702 for Max R. C. Bruhn, Jr. et al., filed Apr. 1, 1970, now U.S. Pat. No. 3,657,943 entitled GEAR SHIFT COUPLING MECHANISM is utilized to attach the shifting stick to the selector 14.

The selector mechanism 14 includes two relatively movable parts, the previously described socket 46 and a carrier member 48. Referring additionally to FIGS. 4 to 6, the carrier member 48 generally is in the shape of a rectangular box opened at the upper and lower ends. The carrier member includes a pair of side walls 50 and 52 and end walls 54 and 56. An opening in the side walls 50 and 52 is provided for mounting the socket for rotation on the bushing 28. The side wall 52 extends downwardly below the level of the end walls and side wall 50 where it terminates in a pair of inwardly directed flanges 58 (FIGS. 2 and 4). The end walls 54 and 56 extend upwardly a slight distance above the side walls 50 and 52 and are provided with aligned, elongated curved slots 60.

The socket portion 46 includes a downwardly extending U-shaped leg portion 62 which tapers inwardly at its lower extremity within the housing 12 to form an actuator engaging arm 64 (FIGS. 2 and 5). The sides 68 of the U-shaped leg portion each have aligned openings therein for mounting of the socket assembly 46 on a shaft 70. The shaft 70 passes through the curved slots 60 in the end walls 54 and 56 of the carrier 48 to fix the socket assembly for movement about an axis defined by the shaft 70 within the carrier 48. The socket 46 is rotatable about the shaft 70 and in addition is vertically shiftable as will be more fully described hereinafter, with the shaft 70 in the elongated slots 60 formed in the end walls 54 and 56. An elongated opening 74 in the leg 62 of the socket 46 is provided to allow passage of the shaft and bushing 28 therethrough and to allow vertical shifting of the socket 46 and shaft 70 in the slot 60 with respect to the shaft and bushing 28. A pair of tension springs 72 are each connected at one of their ends to the shaft 70 and at their opposite ends to the flanges 58 formed on the side walls 52 of the carrier 48. The springs 72 bias the shaft 70 and the selector mounted thereon into the lower extremity of the curved slots 60. Normally, the shaft 70 and socket which is pivoted thereabout is held by the springs 72 in the lower portion of the curved slots 60 for normal forward gear engagement. To effect shifting into reverse gear, the stick and selector assembly is simply lifted vertically upwardly causing the shaft 70 and selector to shift upwardly and outwardly in the curved slot 60. This causes corresponding movement of the arm 64 over the gate 98 and into the notch 86c in the reverse gear actuator member as will be more fully described in the detailed description of the operation of the gear shifting mechanism.

A selector arm biasing spring 78 is positioned between the side walls 52 of the carrier 48 and the leg 62 to bias the leg 62 toward the opposite side wall 50. The bias spring is retained in position by a raised flange 76 on the leg 62 on which the bias spring seats. The opposite side of the spring is seated on a button 80 and is essentially free to slide along a thin, smooth mounting plate 82 positioned between the button and the side wall 52. Preferably, the button 80 is made of a lubricious material, as for example, Teflon or Nylon, to prevent wear and to allow sliding movement of the button on the plate 82.

The actuator members 16, 18, and 20 are essentially identical in construction and are slidably received and movable along the length of the housing through the guide members 34 and 36. The actuator members are slidably mounted in the guide assemblies at each end of the housing. The guides are preferably formed of a hardened plastic-like material, i.e., melamine. As illustrated in FIG. 3, the guides are formed of a pair of facing channel members 82 and 84 each having a channel therein adapted to slidably receive the actuator members. In the preferred embodiment, the actuator members are arcuately shaped having a radius of curvature generally defined from the center of the pivot shaft 26. The actuators are movable in the gudies 34 and 36 in an arc about the shaft 26 as will be more fully described hereinafter.

In FIG. 5, actuator 16 is illustrated in detail. The remaining actuators 18 and 20 are essentially similar in construction except for significant differences which will be pointed out as the description progresses. Since the actuators are similar, they will not individually be described in great detail. Similar parts will be indicated by similar references with the suffix letter "a", "b", or "c" utilized to designate such similar structure.

The actuator 16 is mounted in the pair of channel members 82 positioned at either side of the housing. As previously mentioned, the actuators are arcuately shaped and have an inner curvilinear surface 83 and an outer curvilinear surface 85. A notch or slot 86 extending downwardly from the inner curvilinear surface 83 is provided for engagement with the selector engaging member 64 of the selector assembly 14. A flange 88 extending downwardly from the outer curvilinear surface 84 outside the housing is provided with suitable openings 89 for connection to gear shifting linkages operatively connected to the transmission (not shown). A hole 90 in the face of each of the actuators below the notch is in substantial alignment with the openings in the flange. Similar openings are provided in each of the actuator members and in the side walls 30 and 32 (see FIGS. 1 and 3) to accommodate an alignment pin (not shown) for adjustment of the various gear shifting linkage mechanisms when the shifter assembly is installed in a vehicle.

Referring also to FIG. 3, the spacer and guide members 34 and 36 which hold the side walls 30 and 32 apart also provide a sliding bearing surface for the actuators. The three actuators are generally centrally located within the guides in a curvilinear slot or recess formed therein. A first or lower guide 84 (shown also in FIG. 5) has a recess 90 provided therein having a depth and width just slightly larger than the thickness and width of the actuator 16. The actuator slides in the recess and a metallic wear plate 92 is provided to prevent excessive wear of the guide. A spacer 94 is positioned over the guide 84 and actuator 16 and a second guide 82 having a similar recess 96 therein is provided over the spacer 94. The reverse gear actuator 20 and third-fourth gear actuator 18 are positioned within the recess 96. A gate mechanism 98 is positioned between the actuators 18 and 20. A second metallic wear plate 100 lines the walls of the recess 96 to prevent excessive wear on the guide member.

Referring now again to FIG. 2, the flange members 88 extending from the outer curvilinear surface of each actuator are each formed with respect to the actuator at a slightly different angle to accommodate the shifting linkage mechanisms. The flange 88a on actuator 16 is bent outwardly toward side wall 32 while flange 88c on actuator 20 is bent outwardly toward side wall 30. The flange 88b on actuator 16 extends downwardly in parallel alignment with the side walls of the actuator.

The notches 86 in actuator members 16 and 18 (actuating forward gears first through fourth) are substantially the same depth so that the actuator engaging arm 64 freely passes between slots 86a and 86b depending upon the gear to be engaged. The notch 86c formed in reverse gear actuator 20 includes side walls 102 (FIGS. 1 and 2) and a bottom wall 104. A pair of upstanding side wall extensions or ears 106 extend slightly above the inner curvilinear surface. The gate mechanism 98 positioned between actuators 18 and 20 is provided with a similarly configured notch 108. The gate 98 is not slidable within the guide members but rather is fixed in position with respect thereto such that the notch 108 therein is in alignment with the notches 86 formed in the actuators. When the notches 86a, 86b, and 86c are in alignment with notch 108 in the gate, they cooperatively define a neutral position of the gear shift mechanism.

OPERATION

As will be evident from the foregoing description, the selector 14 is pivotable about two mutually perpendicular axes, i.e., about pivot shaft 26 and also about selector shaft 70. The carrier 48 pivots about the shaft 26 to move the entire selector assembly including the arm 64 along the length of the housing. Depending upon which notch 86 the arm 64 is positioned, it will serve to swing the corresponding actuator in an arc through the guide members 84. In FIG. 2, the selector is shown in a neutral position preparatory to shifting the third and fourth gear actuator member 18 into a gear engaging position.

To shift into the first and second gear actuator 16, the selector is rotated about shaft 70 (FIG. 2) in a clockwise direction against the bias spring 28. This causes movement of arm 64 into notch 86a. The selector may then be pivoted about the pivot shaft 26 to slide the actuator member 16 in the guides 84 into the desired gear engaging position.

Accidental or inadvertent engagement of reverse gear is prevented by the difference in depth of the notch 86b and by the gate 98. Movement of the selector in a counterclockwise direction is prevented by the abutment of arm 64 with the side wall of the gate 98. The gate 98 forms a stop abutment to normally prevent entrance of the arm 64 into the notch 86c in actuator 20. To shift into reverse gear, i.e., to engage actuator 20, the socket assembly must be moved vertically upwardly by lifting upwardly on the shifting stick 47 thereby effecting upward movement of the socket portion 14 within the carrier 48. (See also FIG. 6.) The shaft 70 fixed in the socket moves upwardly and outwardly with the socket 14 following the contour of the curved slot or cam 60 in the end walls 54 and 56 of the carrier 48. The elongated slot 74 in the U-shaped portion of the leg of the socket and selector allows the upward movement of the socket assembly upwardly about pivot shaft and bushing 28.

As the socket 14 moves upwardly, the shaft 70 follows the contour of the curved slot or cam 60, and the arm 64 is biased (due to the forces exerted) against bias spring 78 toward the side wall 30. Simultaneously, the arm 64 is moved upwardly over the gate 98 and through the notch 108 therein to thereby effect engagement of the arm 64 with the notch 86c in actuator 20. The selector may then be pivoted about the pivot shaft or bushing 28 to effect shifting of the actuator 20 out of the neutral position to thereby engage the reverse gear. Bias springs 72 pulling on shaft 70 exert a constant biasing force thereon so that when the selector is moved back into its neutral position, i.e. with slot 86 in alignment with the slot 108 in gate 98, the selector and socket assembly will be pulled vertically downwardly at the same time bias spring 78 exerts a force to push the arm 64 out of the notch 84c in the reverse gear actuator member 20, through the notch 108 in the gate 98 and into the neutral position in the areas of the slots 84a and 84b forming a neutral position.

Only a relatively slight upward force is required to shift the selector mechanism into reverse position. The novel gate and notch provisions in the reverse gear actuator prevent accidental engagement of reverse gear since such engagement requires a separate and distinct operation on the part of the operator to thereby prevent inadvertent engagement of the selector arm 64 into the slot 84c.

ALTERNATE EMBODIMENT OF THE INVENTION

The embodiment of the invention previously described is particularly applicable to a four-speed transmission and is readily converted for use in a conventional three-speed transmission by the simple elimination of the reverse gear actuating components. The alternate embodiment illustrated in FIGS. 7 through 9 is adapted for use with a conventional threespeed transmission utilizing the conventional "H" shifting pattern. The construction of the alternate embodiment is essentially similar to that previously described. Like reference numerals will therefore be utilized to designate like parts and a detailed description will be given only for those different areas. Where necessary, the suffix letter "a" will be utilized to designate similar but modified parts therein. As will become immediately obvious from a cursory examination comparing FIGS. 7 through 9 to FIGS. 1 through 3, the special reverse gear actuator and gate mechanism are not included in the alternate embodiment. Since no special provision is needed to prevent accidental engagement of reverse gear, the vertical shifting mechanism including the cam slot and shaft between the socket and the carrier have also been eliminated. The carrier 48a is pivotally mounted on a shaft 26a which is fixed in the end walls 50a and 52a of the carrier 48a. A bias spring 72a is provided about the pivot shaft 26a. Bias spring 72a acts against the inner wall of the carrier 48a and the downwardly depending U-shaped arm 74a to maintain the arm 64a and socket in a generally vertical position. The construction of the actuator levers 16a and 18a is identical to that previously described.

The basic operation when shifting between actuator 16a and 18a through the neutral position as defined by the alignment of the notches 86a is identical to that previously described. Selection of the gears to be energized, that is first and second or third and reverse is accomplished by pivoting the shifting stick 47a and selector 14a about shaft 70a and thereafter rotating the selector assembly about pivot shaft 26a to slide the actuators 16a or 18a in the guides and spacer blocks 84.

In each of the embodiments shown, the actuator elements are uniquely mounted for sliding movement without the necessity of pivotally mounting the actuator members as is necessary in the prior art. This unique mounting in itself overcomes many of the disadvantages of the prior art as outlined above. In addition, from a manufacturing standpoint and as will become obvious to those skilled in the art, the present invention readily lends itself to relatively inexpensive manufacturing procedures. The utilization of common components in any of a variety of shifting mechanisms, i.e., three and/or four speed, for example, considerably reduces the costs thereof. The lift gate mechanism for preventing accidental engagement of reverse gear is also a significant advantage of this invention. The arrangement while preventing such engagement is readily and simply overcome with very little effort required on the part of the operator.

While a preferred and an alternate embodiment of the invention have been illustrated in detail, it will be recognized by those skilled in the art that other modifications incorporating the teachings thereof may be readily made in the light of this disclosure. Accordingly, all modifications embodying the principles thereof are to be considered as included in the appended claims unless these claims by their language expressly state otherwise.

The embodiments of the invention in which an exclusive property or privilege is claimed are defined as follows.

1. A shifting mechanism comprising:
a housing;
a plurality of gear actuating members mounted in said housing, said actuating members being arcuate in shape;
a selector having an extending arm member thereon for selectively engaging one of said plurality of gear-actuating members; means mounting said selector within said housing for causing said engaging means to move into different positions for selectively engaging different ones of said actuating members for moving said actuator members into a gear-activating position;
guide means for said actuator members, said actuator members being mounted for sliding movement in said guide means and cooperable engaging means on said actuator members providing a selective operable connection between said engaging means on said selector and said actuator member; said operable connection including a notch in one of said actuator members and extending arm member receiving an extension of the other of said members.

2. The apparatus as defined in claim 1 wherein two actuator members are slidably mounted in said housing, said arm member is on said selector and said notch is provided on each of said actuator members, said arm member engageable with one of said actuator members in a first position and engageable with the other of said actuator members in a second position.

3. The apparatus as defined in claim 1 including at least a pair of actuating members including a forward gear actuator member; a reverse gear actuator member and gate means associated with said reverse gear actuator member to prevent accidental engagement thereof with movement of said selector about one of said axis.

4. The apparatus as defined in claim 3 wherein said gate means includes a notch in said gear actuator members, said notch in said reverse gear actuator member having a depth less than that of said notch in said forward gear actuator members to prevent engagement of said arm member into said reverse gear notch; and camming means on said selector to shift said arm member into said notch upon the application of an upward force on said selector.

5. The apparatus as defined in claim 4 wherein said camming means includes means on said selector wherein said arm member is shiftable vertically with respect to said actuators to allow passage of said arm member through said gate means into said notch in said reverse gear actuator.

6. The apparatus as defined in claim 5 and further including biasing means on said selector for urging said selector arm into said notch in said forward gear actuator members when said notch in said reverse gear is in alignment therewith.

7. The apparatus as defined in claim 6 wherein said notches in said forward and said reverse gear actuators when in alignment, define a neutral gear position.

8. A gear shift mechanism comprising:
a housing;
a selector;
means mounting said selector in said housing for rotation about an axis;
a plurality of gear actuating members in said housing spaced radially from the said axis of said selector, said actuating members being arcuate in shape and mounted side-by-side parallel to each other for sliding movement in said housing through an arc defined about said axis; and
engaging means on said selector, said engaging means being movable in a direction substantially along said axis for operatively and selectively engaging said actuator members one at a time whereby rotation of said selector about said axis effects a corresponding sliding movement of one of said actuator members through said arc.

9. The gear shift mechanism as defined in claim 8 wherein said selector is also pivotally mounted about an axis perpendicular to said previously mentioned axis.

10. The gear shift mechanism as defined in claim 8 wherein said engaging means comprises an arm member pivotally mounted on said selector for movement along a plane transverse to said axis; and means on each of said actuator members selectively engageable by said arm member whereby a selected one of said actuator levers may be engaged by said arm member upon movement along said plane and said selected actuator lever is movable through said arc in response to movement of said selector about said axis.

11. The apparatus as defined in claim 10 and further including gate means adjacent one of said actuator members to normally prevent engagement of said arm member with said one of said actuator members; means supporting said arm member for vertical movement, said arm member shiftable vertically with respect to said axis to allow passage of said arm member through said gate means for engagement with said one of said actuator members.

12. The apparatus as defined in claim 8 wherein said plurality of gear actuating members including a forward gear actuator member and a reverse gear actuator member and further including gate means associated with said reverse gear actuator member to prevent accidental engagement thereof with movement of said selector about said axis.

13. The apparatus as defined in claim 12 wherein said gate means includes a notch in said gear actuator members, said notch in said reverse gear actuator member having a depth less than that of said notch in said forward gear actuator member to prevent engagement of said arm member into said reverse gear notch; and camming means on said selector to shift said arm member into said notch in said reverse gear actuator upon the application of an upward force on said selector.

14. The apparatus as defined in claim 13 wherein said camming means includes means on said selector wherein said arm member is shiftable vertically with respect to said actuator members to allow passage of said arm member through said gate means into said notch in said reverse gear actuator.

15. The apparatus as defined in claim 14 and further including biasing means on said selector for urging said selector arm into said notch in said forward gear actuator members when said notch in said reverse gear is in alignment therewith.

16. The apparatus as defined in claim 15 wherein said notches in said forward and said reverse gear actuators when in alignment, define a neutral gear position.

* * * * *